United States Patent
Liang et al.

(10) Patent No.: US 8,204,071 B2
(45) Date of Patent: Jun. 19, 2012

(54) METHODS AND DEVICES FOR ALLOCATING FREQUENCY RANGES

(75) Inventors: Ying Chang Liang, Singapore (SG); Yonghong Zeng, Singapore (SG); Zhongding Lei, Singapore (SG); Po Shin Francois Chin, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 12/092,957

(22) PCT Filed: Nov. 3, 2006

(86) PCT No.: PCT/SG2006/000329
§ 371 (c)(1),
(2), (4) Date: Nov. 13, 2008

(87) PCT Pub. No.: WO2007/053121
PCT Pub. Date: May 10, 2007

(65) Prior Publication Data
US 2009/0219944 A1    Sep. 3, 2009

Related U.S. Application Data

(60) Provisional application No. 60/734,080, filed on Nov. 7, 2005.

(51) Int. Cl.
*H04L 12/28* (2006.01)
*H04B 7/00* (2006.01)
(52) U.S. Cl. .......................................... 370/431; 455/509
(58) Field of Classification Search .................. None
See application file for complete search history.

(56) References Cited

U.S. PATENT DOCUMENTS

| | | | |
|---|---|---|---|
| 2002/0009158 A1* | 1/2002 | Souissi et al. ............... | 375/295 |
| 2004/0031058 A1* | 2/2004 | Reisman ..................... | 725/112 |
| 2004/0048630 A1* | 3/2004 | Shapira ....................... | 455/509 |
| 2004/0203815 A1  | 10/2004 | Shoemake et al. | |
| 2005/0032514 A1* | 2/2005 | Sadri et al. .................. | 455/423 |
| 2005/0032534 A1  | 2/2005 | Yoshizawa et al. | |
| 2006/0083205 A1* | 4/2006 | Buddhikot et al. .......... | 370/338 |
| 2006/0089099 A1* | 4/2006 | Buchwald et al. .......... | 455/41.2 |
| 2007/0100922 A1* | 5/2007 | Ashish ........................ | 708/400 |
| 2008/0219201 A1* | 9/2008 | Challapali et al. .......... | 370/312 |
| 2008/0259859 A1* | 10/2008 | Cordeiro et al. ............ | 370/329 |
| 2009/0161024 A1* | 6/2009 | Gao et al. ................... | 348/731 |

FOREIGN PATENT DOCUMENTS

EP    0632598    1/1995
(Continued)

OTHER PUBLICATIONS

International Search Report on PCT SG2006-000329, mailed on Dec. 14, 2006.

(Continued)

*Primary Examiner* — Clemence Han
(74) *Attorney, Agent, or Firm* — Choate, Hall & Stewart, LLP

(57) ABSTRACT

A method of allocating frequency ranges to at least one communication device is provided. The method comprises determining available frequency ranges within a plurality of frequency ranges, combining the available frequency ranges to at least one combined logical frequency range, and allocating the at least one combined logical frequency range to the at least one communication device.

29 Claims, 4 Drawing Sheets

FOREIGN PATENT DOCUMENTS

| | | |
|---|---|---|
| EP | 0 980 190 A1 | 2/2000 |
| EP | 1 217 851 A1 | 6/2002 |
| EP | 1 343 338 A1 | 9/2003 |
| JP | 2000-022712 | 1/2000 |
| JP | 2002-158667 | 5/2002 |
| WO | WO-99/26430 | 5/1999 |
| WO | WO-01-31942 | 5/2001 |
| WO | WO-2005/015866 A1 | 2/2005 |
| WO | WO 2006/022903 A2 | 3/2006 |

OTHER PUBLICATIONS

Written Opinion by the ISA on PCT SG2006-000329, mailed on Dec. 14, 2006.

International Preliminary Report on Patentability, PCT-SG2006-000329, mailed on May 15, 2008.

A PHY/MAC Proposal for IEEE 802.22 WRAN System, Part 2: The Cognitive MAC, by ETRI, FT, HuaWei, I2R, Motorola, NextWave, Philips, Runcom, Samsung, STM, Thomson, Mar. 2006.

Extended European Search Report for EP 06813109.3, mailed Mar. 8, 2011, (12 pages).

First Office Action for CN 200680047590.7, mailed Mar. 23, 2011, (17 pages).

Office Action for Japanese Application No. 2008-53990, mailed on Dec. 6, 2011, and English translation (5 pages).

\* cited by examiner

METHODS AND DEVICES FOR ALLOCATING FREQUENCY RANGES

The present invention refers to methods for allocating frequency ranges for at least one communication device and for a plurality of communication devices, as well as to the respective devices.

Due to the advent of wireless communication technology, frequency spectrum has become an extremely precious commodity. It is becoming increasingly difficult to obtain available frequency spectrum for new wireless communication technologies and applications. It is therefore an objective nowadays to maximize the use of all existing allocated frequency spectrum.

An approach which can be used to achieve this objective of maximizing the use of all existing allocated frequency spectrum is a concept called opportunistic spectrum access. How opportunistic spectrum access works can be described as follows.

Within a frequency spectrum already allocated, a frequency range of interest is typically licensed for an incumbent communication service. Here, an incumbent communication service refers to a communication service for which a frequency range of interest has been allocated as the licensed user. Accordingly, no other communication service is supposed to operate in this frequency range of interest. However, it is possible that this incumbent communication service may not be in operation at certain locations during specific times. According to the concept of opportunistic spectrum access, other communication services should take the opportunity to operate at this frequency range at these locations during the times when the incumbent communication service is not in operation.

In this regard, since the frequency range of interest has been licensed for use for the incumbent communication service, the incumbent communication service must have the highest priority of usage. This means that whenever the incumbent communication service goes back into operation again, other communication services, which are of lower priority of usage, must therefore stop using the frequency range of interest immediately.

Therefore, in order to be able to perform all the actions described above, other communication services must have the capability to determine whether a frequency range of interest is used by an incumbent communication service. If it is determined that the frequency range of interest is not being used by an incumbent communication service, then the other communication services can use the frequency range of interest. In addition, if it is determined that the frequency range of interest is being used again by the incumbent communication service, then these other communication services must stop operating and vacate the frequency range of interest immediately, so that the transmissions of these other communication services do not become interference to the incumbent communication service.

In view of the above, it is not always possible to obtain a contiguous frequency range of sufficient bandwidth for use by the other communication services. Typically, there would be pockets of contiguous available frequency ranges throughout the frequency spectrum of interest, but not all pockets of contiguous available frequency ranges would be of sufficient bandwidth for use of the other communication services. Accordingly, there is need for an efficient and effective method for combining and allocating available frequency ranges.

One example for a communication service operating in a frequency range already allocated for other communication services is the proposed IEEE 802.22 wireless regional area network (WRAN) [1], which is currently in the process of standardization. The proposed IEEE 802.22 WRAN operates in the very high frequency (VHF) and the ultra high frequency (UHF) frequency band (between 47 MHz and 910 MHz), which have already been allocated for the use of television (TV) broadcast and Part 74 wireless microphone devices. In order to be able to use the available frequency ranges within the frequency spectrum already allocated to TV broadcasts and to Part 74 devices, an efficient and effective method for combining and allocating available frequency ranges is therefore required for WRAN devices, such as base stations (BS) and customer premise equipments (CPE).

This problem is solved by the methods and devices as defined in the respective independent claims of the present application.

In a first aspect of the invention, a method of allocating frequency ranges to at least one communication device is provided, comprising determining available frequency ranges within a plurality of frequency ranges, combining the available frequency ranges to at least one combined logical frequency range, and allocating the at least one combined logical frequency range to the at least one communication device.

The embodiments which are described in the context of the methods of classifying frequency ranges and allocating available frequency ranges to at least one communication device or to a plurality of communication devices provided, are analogously valid for the devices.

Embodiments of the invention emerge from the dependent claims.

In one embodiment, the communication device may be, but is not limited to, a wireline communication device, a powerline communication device, a radio communication device, a terminal communication device or a Consumer Premise Equipment device. A radio communication device, for example, may be, but is not limited to, a mobile radio communication device, a satellite radio communication device, or a mobile radio base station.

The method of allocating frequency ranges to at least one communication device provided, may be used in any communication system which uses time division duplex (TDD), for example. In TDD, time division is used to enable bi-directional communication on a single communication resource. While TDD is typically used in wireless communications, TDD may also be used in non-wireless communications. Accordingly, in this embodiment, the communication device may also be a wireline communication device or a powerline communication device.

By determining available frequency ranges within a plurality of frequency ranges, frequency ranges which are not being used by an incumbent communication service, or in other words, the available frequency ranges can be determined.

Once the determining available frequency ranges within a plurality of frequency ranges is completed, the available frequency ranges determined can be combined in order to obtain sufficient frequency bandwidth to support a communication service which can operate using opportunistic spectrum access. Accordingly, in one embodiment, a logical combined frequency range may be, but is not limited to, a combination of non-contiguous frequency ranges which has sufficient frequency bandwidth to support a communication service operating using opportunistic spectrum access.

The at least one combined logical frequency range may then be allocated to the at least one communication device. In this regard, it is possible that more than one communication device may share the use of a logical combined frequency range. In addition, it is also possible that one communication device may use more than one logical combined frequency range.

In one embodiment, the method of allocating frequency ranges to at least one communication device provided, further comprises grouping at least one frequency range into one frequency channel, respectively, and allocating or releasing portions of frequency channels. In this embodiment, a frequency channel may be considered as, but is not limited to, a group of frequency ranges which has, when combined together, sufficient bandwidth to support a communication service using the concept of opportunistic spectrum access, for example.

In addition, in this embodiment, if it is determined that a frequency range previously used by an incumbent communication service is now available, this newly available frequency may be combined with another available frequency range, and then allocated for use by communication services operating using the concept of opportunistic spectrum access. On the other hand, if it is determined that an incumbent communication service is now operating again in a frequency range currently used by communication services operating using the concept of opportunistic spectrum access, then this frequency range, which may have been combined as a portion of a frequency channel as described earlier, is released immediately to avoid interfering with the incumbent communication service.

In one embodiment a multiple access transmission technology is used.

In one embodiment, the multiple access transmission technology is selected from a group of multiple access transmission technologies consisting of time division multiple access, frequency division multiple access, code division multiple access, or orthogonal frequency division multiple access.

In one embodiment, the plurality of frequency ranges is a continuous frequency range.

For example, in one embodiment, the proposed WRAN system [1] described earlier may be used, which is also an example of the other communication services which operate using the concept of opportunistic spectrum access. The proposed WRAN system operates in the frequency in the VHF/UHF frequency band between 47 MHz and 910 MHz, which is a contiguous frequency range.

In a second aspect of the invention, a method of classifying frequency ranges is provided, comprising scanning a plurality of frequency ranges, and determining, whether a signal transmission in a respective frequency range is below a predetermined threshold. In the case where the signal transmission in the respective frequency range is below the predetermined threshold, then the frequency range is classified as available frequency range. In the case where the signal transmission in the respective frequency range is not below the predetermined threshold, then the frequency range is skipped or the frequency range is classified as being non-available.

In a third aspect of the invention, a method of allocating frequency ranges to a plurality of communication devices is provided, comprising determining available frequency ranges within a plurality of frequency ranges, combining the available frequency ranges to at least one combined logical frequency range, and allocating the at least one combined logical frequency range to the plurality of communication devices.

In a fourth aspect of the invention, a method of allocating frequency ranges to at least one communication device is provided, comprising determining available frequency ranges within a plurality of frequency ranges, combining the available frequency ranges to at least one combined logical frequency range, allocating the at least one combined logical frequency range to the plurality of communication devices, after allocating the at least one combined logical frequency range to the at least one communication device, determining, whether a frequency range is used by a communication device of higher priority than the at least one communication device the frequency range has been allocated to, and releasing the determined frequency range from the at least one communication device having a lower priority.

As used herein, the term priority refers the right to use a frequency range of interest. Using the proposed WRAN system [1] as an illustration, the incumbent communication services within its frequency band of operation are TV broadcasts and Part 74 device communication services. In this case, the TV broadcasts may have the highest priority, while Part 74 device communication services may have medium priority and WRAN communication services may have the lowest priority.

In one embodiment, the higher priority communication device may be a broadcasting device.

In one embodiment, the broadcasting device may be selected from a group consisting of a TV transmission station, a radio transmission station or a radio microphone device.

In a fifth aspect of the invention, a frequency ranges allocating device is provided, comprising a determination unit determining available frequency ranges within a plurality of frequency ranges, a combiner combining the available frequency ranges to at least one combined logical frequency range, and an allocator allocating the at least one combined logical frequency range to the at least one communication device.

In a sixth aspect of the invention, a communication device is provided, comprising a frequency ranges allocating device, comprising a determination unit determining available frequency ranges within a plurality of frequency ranges, a combiner combining the available frequency ranges to at least one combined logical frequency range, and an allocator allocating the at least one combined logical frequency range to the at least one communication device.

As mentioned earlier, the communication device may be, but is not limited to, a wireline communication device, a powerline communication device, a radio communication device, a terminal communication device or a Consumer Premise Equipment device. A radio communication device, for example, may be but is not limited to, a mobile radio communication device, a satellite radio communication device, or a mobile radio base station.

In a seventh aspect of the invention, a frequency ranges classifier is provided, comprising a scanner scanning a plurality of frequency ranges, and a determination unit determining, whether a signal transmission in a respective frequency range is below a predetermined threshold. In the case where the signal transmission in the respective frequency range is below the predetermined threshold, then the frequency range is classified as available frequency range. In the case where the signal transmission in the respective frequency range is not below the predetermined threshold, then the frequency range is skipped or the frequency range is classified as being non-available.

In an eighth aspect of the invention, a frequency ranges allocating device is provided, comprising a determination unit determining available frequency ranges within a plurality of frequency ranges, a combiner combining the available frequency ranges to at least one combined logical frequency range, an allocator allocating the at least one combined logical frequency range to the at least one communication device, a controller, after allocating the at least one combined logical frequency range to the at least one communication device, determining, whether a frequency range is used by a communication device of higher priority than the at least one communication device the frequency range has been allocated to, and releasing the determined frequency range from the at least one communication device having a lower priority.

Illustratively, when it is determined that there are pockets of unused frequency ranges, these pockets of unused frequency ranges may be combined together into a logical frequency channel, which can be allocated to a communication service. This is despite the fact that these pockets of unused frequency ranges are not contiguous.

Subsequently, when it is determined that a frequency range within the pockets of unused frequency ranges combined and allocated into a logical frequency channel, as described above, is now being used by an incumbent communication service, that frequency channel is released. The remaining unused frequency ranges may be combined again into another frequency channel if its combined bandwidth is sufficient.

The method described above has the following advantages. Firstly, it enables unused frequency ranges within an already allocated frequency band to be used. Secondly, it allows pockets of non-contiguous frequency ranges to be combined and allocated for use by suitable communication services.

The embodiments which are described in the context of the methods of classifying frequency ranges and allocating available frequency ranges to at least one communication device or to a plurality of communication devices provided, are analogously valid for the devices.

FIG. 1 shows a communication system 100 according to an embodiment of the invention.

The communication system 100 comprises a communication system cell 101, which comprises a base station (BS) 103, a first communication device (CD1) 105, a second first communication device (CD2) 107 and a third first communication device (CD3) 109.

The data transmission of the communication cell 101 may use frequency ranges not used by the television (TV) transmission station (TS) 111, which is located near the communication cell 101. In this case, the TV broadcast is the incumbent communication service.

The communication system 100 may represent the proposed IEEE 802.22 wireless regional area network (WRAN) [1], which is an example of the other communication services operating based on the concept of opportunistic spectrum access. The proposed IEEE 802.22 WRAN operates in the very high frequency (VHF) and the ultra high frequency (UHF) frequency band (between 47 MHz and 910 MHz), which have already been allocated for the use of TV broadcast and Part 74 wireless microphone devices.

In order to avoid causing interference to TV broadcasts and to Part 74 devices, WRAN devices, such as base stations (BS) and customer premise equipments (CPE), must be able to carry out a reliable detection of the incumbent communication services, while determining the availability of the frequency ranges in which they are operating.

Figure 2:
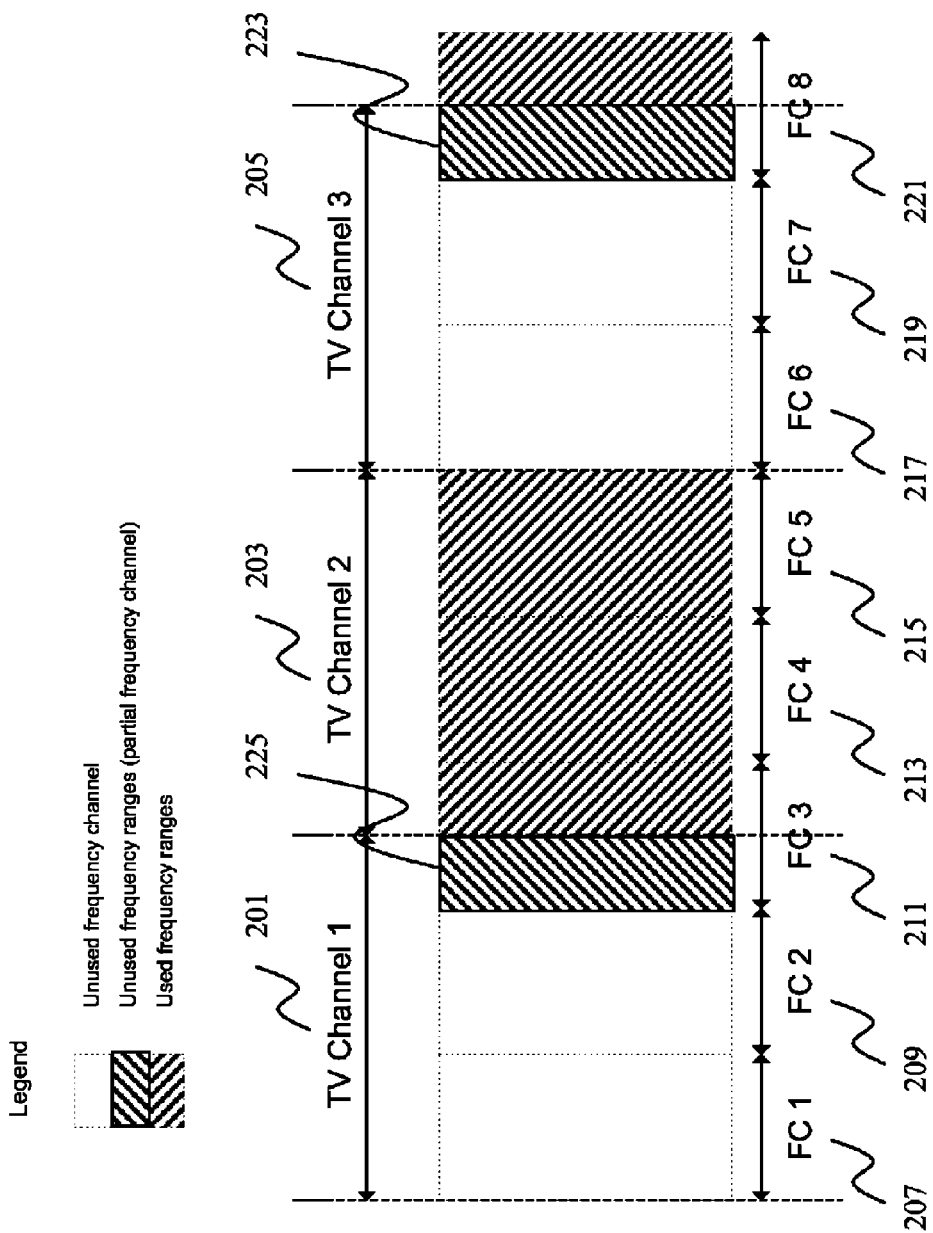
FIG. 2 shows an illustration of the combination of frequency ranges according to an embodiment of the invention.

FIG. 2 shows an illustration of the combination of frequency ranges according to an embodiment of the invention.

In this illustration, portions of 3 TV channel frequency bands, namely, a first frequency band corresponding to a first TV channel (TV Channel 1) 201, a second frequency band corresponding to a second TV channel (TV Channel 2) 203 and a third frequency band corresponding to a third TV channel (TV Channel 3) 205, are being used by communication services using the concept of opportunistic spectrum access. There are 8 frequency channels in these communication services, namely, a first frequency channel (FC1) 207, a second frequency channel (FC2) 209, a third frequency channel (FC3) 211, a fourth frequency channel (FC4) 213, a fifth frequency channel (FC5) 215, a sixth frequency channel (FC6) 217, a seventh frequency channel (FC7) 219 and an eighth frequency channel (FC8) 221. For the purpose of this illustration, the frequency ranges of 2 TV channel frequency bands are grouped and arranged into 5 frequency channels. In general, it is possible to have any combination of x TV channel frequency bands grouped and arranged into y frequency channels.

Figure 1:
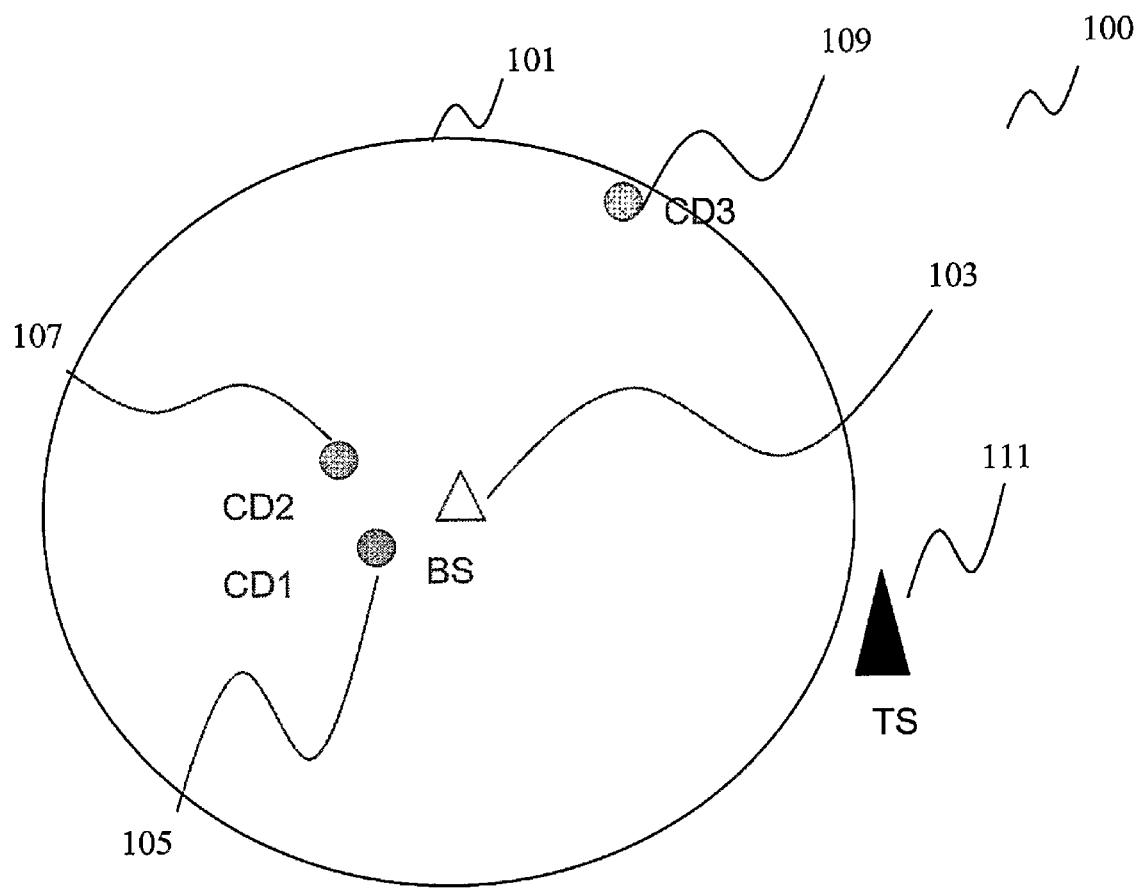
FIG. 1 shows a communication system according to an embodiment of the invention.

For example, in this illustration, the TV broadcast on the 3 TV channel frequency bands in FIG. 2 may be transmitted by the TV transmission station 111 of FIG. 1. When it is determined that some of the various frequency channels, FC1-FC8, are unused, these unused frequency channels will be used by the devices in the communication system cell 101, namely, the base station 103 and the 3 communication devices, CD1-CD3, for their signal transmissions.

In this illustration, only the second frequency band corresponding to the second TV channel (TV Channel 2) 203 is being used by incumbent communication services. Accordingly, the frequency ranges allocated to the first frequency band corresponding to the first TV channel (TV Channel 1) 201 and the third frequency band corresponding to the third TV channel (TV Channel 3) 205 can be used by communication services using the concept of opportunistic spectrum access. In addition to the unused frequency channels, the first frequency channel (FC1) 207, the second frequency channel (FC2) 209, the sixth frequency channel (FC6) 217 and the seventh frequency channel (FC7) 219, an additional frequency channel may be obtained by combining the unused frequency range 223 of the eighth frequency channel (FC8) 221 and the unused frequency range 225 of the third frequency channel (FC3) 211. This additional frequency channel does not have a contiguous frequency range.

A frequency channel may be shared by a plurality of communication devices. For example, in this illustration, the first frequency channel (FC1) 207 may be allocated for use by only one communication device, but the second frequency channel (FC2 209) may be allocated for use by two communication devices. In this case, some control information is provided to these two communication devices, so that each communication device will know when to start and end its transmissions and when to receive signals transmitted to it.

It is also possible that more than one frequency channel is allocated to one communication device. For example, the first frequency channel (FC1) 207 and the second frequency channel (FC2) 209 may be allocated for use by only one communication device. The allocation of more than one frequency channel to a communication device may be carried out in order to increase the rate of data transmission, or to improve the performance of the transmission channel in terms of its error rate. Again, some control information must be provided to this communication device, so that it knows which frequency channels to use.

Figure 3:
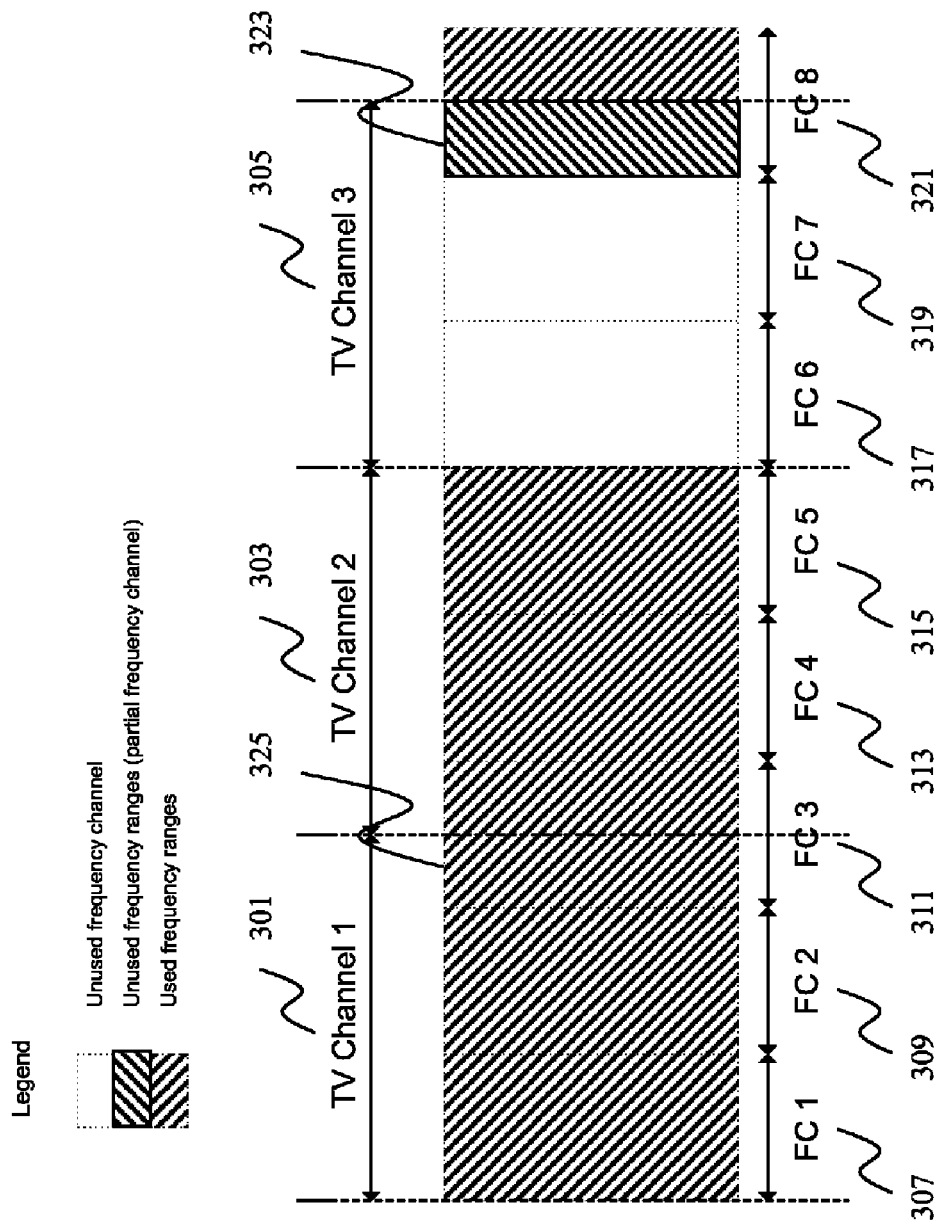
FIG. 3 shows an illustration of the release of frequency ranges according to an embodiment of the invention.

FIG. 3 shows an illustration of the release of frequency ranges according to an embodiment of the invention.

In this illustration, the 3 TV channel frequency bands and the 8 frequency channels, labeled 301-321 corresponds to the respective labeled items of 201-221 in FIG. 2.

This illustration shows the frequency range of interest in FIG. 2 after some time had elapsed, and it was determined that the frequency ranges in the first frequency band corresponding to the first TV channel (TV Channel 1) 301 are no longer available, i.e., being used again by incumbent communication services, which in this case is the TV broadcast, as mentioned earlier. In this embodiment, the frequency channels, the first frequency channel (FC1) 307 and the second frequency channel (FC2) 309 are released accordingly since they are being used by communication devices which have a lower priority than the incumbent communication services.

In addition, the previously unused frequency range 325 in FC3 311 is no longer available, and therefore, must be released. Accordingly, a portion of the frequency channel obtained earlier through the combining of the unused frequency range 323 and the previously unused frequency range 325, is released. Since the unused frequency range 323 does not have sufficient bandwidth to form a new frequency channel by itself, it remains unused.

Therefore, in this case, there are only two frequency channels available for use by communication services using the concept of opportunistic spectrum access, namely, the sixth frequency channel (FC6) 317 and the seventh frequency channel (FC7 319).

In this embodiment, a frequency channel may be considered as, but is not limited to, a group of frequency ranges which has, when combined together, sufficient bandwidth to support a communication service using the concept of opportunistic spectrum access. Typically, a frequency channel is a group of non-contiguous of frequency ranges.

In this regard, when it is determined that a frequency range is no longer available, but is currently grouped with other frequency ranges to a frequency channel, the portion of the frequency channel corresponding to the frequency range must be released, i.e., may be no longer used by another communication service than the communication service incumbent for this frequency range. A new frequency channel may be formed again by combining the unused available portions of the old frequency channel together with other available frequency ranges.

In this conjunction, the determining of whether a frequency range is available or not may be carried out as follows. As an initial step, this involves determining whether a signal transmission in a respective frequency range is below a predetermined threshold. The predetermined threshold is a settable parameter.

If it is determined that the signal transmission in the respective frequency range is below the predetermined threshold, then the frequency range is classified as available frequency range. If it is determined that the signal transmission in the respective frequency range is not below the predetermined threshold, then the frequency range is skipped or the frequency range is classified as being non-available.

Both FIGS. 2 and 3 show that the determining of whether a frequency range is available or not is carried out before using an available frequency, during the use of the available frequency as well as after using an available frequency. Before using an available frequency, it first is determined that the frequency range of interest is available, or not being used by a communication service of higher priority. When using an available frequency, it is determined that the frequency range of interest is still not used by a communication service of higher priority, i.e., a communication service of higher priority is not in operation in the frequency range of interest. After using an available frequency, i.e., the frequency range of interest was released to avoid interfering with the operation of a communication service of higher priority, the frequency range is used again only if it was determined that the frequency range of interest is available.

Figure 4:
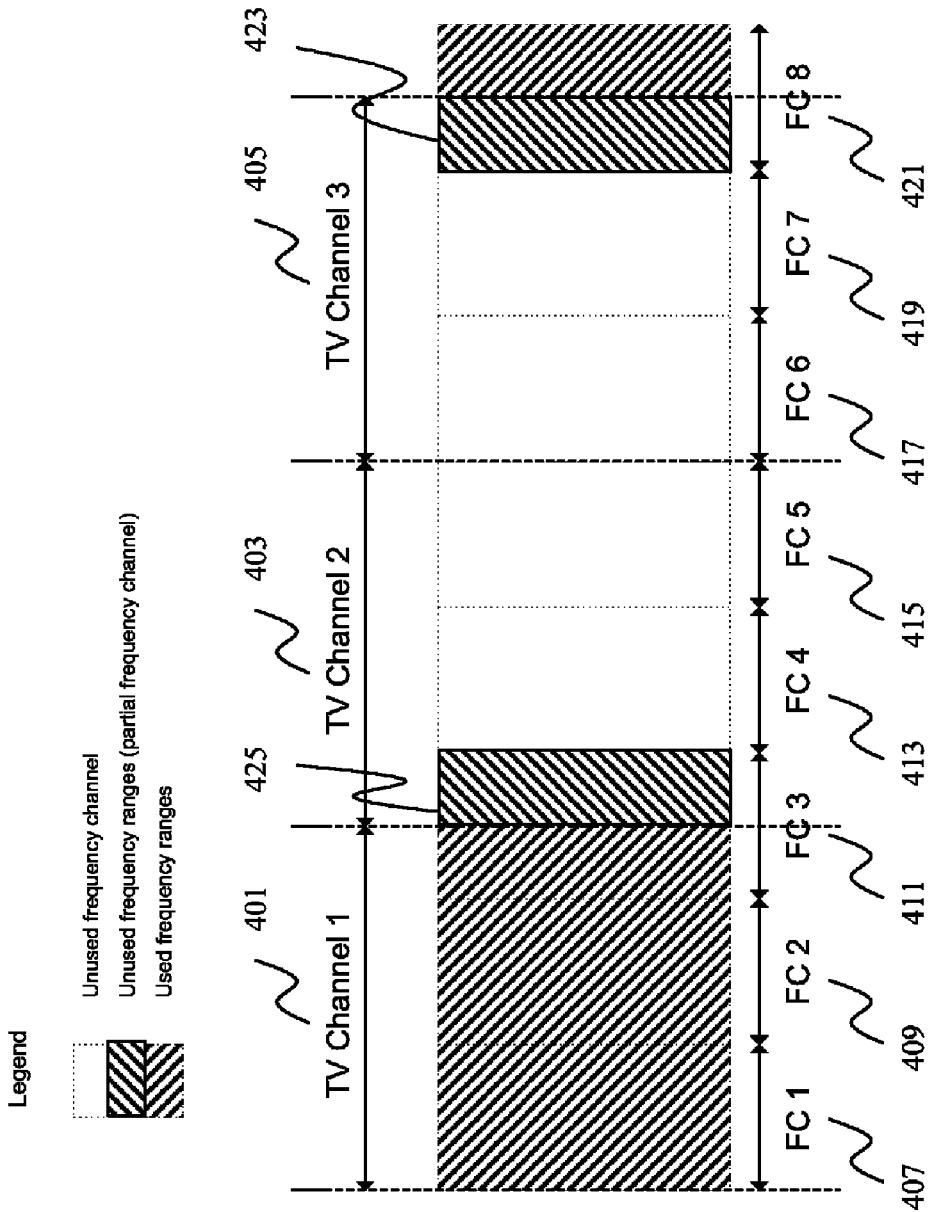
FIG. 4 shows another illustration of the combination of frequency ranges according to an embodiment of the invention.

FIG. 4 shows another illustration of the combination of frequency ranges according to an embodiment of the invention.

In this illustration, the 3 TV channel frequency bands and the 8 frequency channels, labeled 401-421 corresponds to the respective labeled items of 201-221 in FIG. 2.

This illustration shows the frequency range of interest in FIG. 3 after some time had elapsed, and it was determined that the frequency ranges in the second frequency band corresponding to the second TV channel (TV Channel 2) 403 are now available, i.e., no longer being used by incumbent communication services. In this embodiment, the frequency channels, the fourth frequency channel (FC4) 413 and the fifth frequency channel (FC5) 415 are allocated for use by communication services using the concept of opportunistic spectrum access accordingly.

In addition, the previously unused frequency range 423 in FC8 421 may now be combined with the newly unused portion 425 of FC3 411 to form a new frequency channel. Therefore, there are now five frequency channels available for use by communication services using the concept of opportunistic spectrum access, namely, the fourth frequency channel (FC4) 413, the fifth frequency channel (FC5) 415, the sixth frequency channel (FC6) 417, the seventh frequency channel (FC7) 419 and the new frequency channel formed by combining the frequency range 423 with the frequency range 425.

Alternatively, the 5 frequency channels here may be formed by taking the contiguous frequency range for the second frequency band corresponding to the second TV channel (TV Channel 2) 403 and the third frequency band corresponding to the third TV channel (TV Channel 3) 405, and then arranging this contiguous frequency range into 5 contiguous frequency channels. In this case, for example, the seventh frequency channel (FC7) 419 which may be in use, is first released, and then the portion of the seventh frequency channel (FC7) 419 adjacent to the unused frequency range 423 is combined with the unused frequency range 423, to form a new contiguous frequency channel. Continuing this process with the sixth frequency channel (FC6) 417, the fifth frequency channel (FC5) 415, the fourth frequency channel (FC4) 413 and the unused frequency range 425, 5 contiguous frequency channels may be formed.

While the illustrations in FIGS. 1, 2 and 3 have shown that the frequency channels are of the same bandwidth, it is possible that the frequency channels may not be of the same bandwidth.

The illustrations in FIGS. 1 and 3 have shown that a frequency channel may be formed by combing two non-contiguous frequency ranges. However, it is possible that a frequency channel may also be formed by combining more than two non-contiguous frequency ranges.

In this document, the following publication is cited:

[1] "*A PHY/MAC Proposal for IEEE 802.22 WRAN System, Part* 2: *The Cognitive MAC*", by ETRI, F T, HuaWei, I2R, Motorola, NextWave, Philips, Runcom, Samsung, STM, Thomson, March 2006.

What is claimed is:

1. A method of allocating frequency ranges, comprising:
   determining available frequency ranges within a plurality of frequency ranges, wherein a frequency range is available if the frequency range is not being used by an incumbent communication service;

combining the available frequency ranges to at least one combined logical frequency range; and allocating the at least one combined logical frequency range to only one communication device of a plurality of communication devices, wherein the at least one combined logical frequency range is a non-continuous frequency range.

2. The method of claim 1, the communication device being a wireline communication device.

3. The method of claim 1, the communication device being a powerline communication device.

4. The method of claim 1, the communication device being a radio communication device.

5. The method of claim 4, the communication device being a mobile radio communication device.

6. The method of claim 4, the communication device being a satellite radio communication device.

7. The method of claim 4, the communication device being a mobile radio base station.

8. The method of claim 1, the communication device being a terminal communication device.

9. The method of claim 1, the communication device being a Consumer Premise Equipment device.

10. The method of claim 1, further comprising
grouping at least one frequency range into one frequency channel, respectively;
allocating or releasing portions of frequency channels.

11. The method of claim 1, using a multiple access transmission technology.

12. The method of claim 11, the multiple access transmission technology being selected from a group of multiple access transmission technologies consisting of:
time division multiple access,
frequency division multiple access,
code division multiple access, and
orthogonal frequency division multiple access.

13. The method of claim 1, the plurality of frequency ranges being a continuous frequency range.

14. The method according to claim 1,
wherein the at least one combined logical frequency range comprises a first available frequency range and a second available frequency range, the first available frequency range being non-continuous with the second available frequency range, and
wherein the first available frequency range has a bandwidth being different from that of the second available frequency range.

15. A method of allocating frequency ranges to a plurality of communication devices, comprising:
determining available frequency ranges within a plurality of frequency ranges, wherein a frequency range is available if the frequency range is not being used by an incumbent communication service;
combining the available frequency ranges to at least one combined logical frequency range; and
allocating the at least one combined logical frequency range to the plurality of communication devices,
wherein the at least one combined logical frequency range comprises a first available frequency range and a second available frequency range, the first available frequency range being non-continuous with the second available frequency range, and
wherein the first available frequency range has a bandwidth being different from that of the second available frequency range.

16. A method of allocating frequency ranges, comprising:
determining available frequency ranges within a plurality of frequency ranges, wherein a frequency range is available if the frequency range is not being used by an incumbent communication service;
combining the available frequency ranges to at least one combined logical frequency range; allocating the at least one combined logical frequency range to only one communication device of a plurality of communication devices, wherein the at least one combined logical frequency range is a non-continuous frequency range;
after allocating the at least one combined logical frequency range to the one communication device, determining, whether a first frequency range is used by a higher priority communication device than the one communication device; and
releasing the first frequency range from the one communication device.

17. The method of claim 16, the higher priority communication device being a broadcasting device.

18. The method of claim 17, the broadcasting device being selected from a group of broadcasting devices consisting of:
a TV transmission station;
a radio broadcasting station; and
a radio microphone device.

19. A frequency range allocating device, comprising:
a determination unit configured to determine available frequency ranges within a plurality of frequency ranges, wherein a frequency range is available if the frequency range is not being used by an incumbent communication service;
a combiner configured to combine the available frequency ranges to at least one combined logical frequency range; and
an allocator configured to allocate the at least one combined logical frequency range to only one communication device,
wherein the at least one combined logical frequency range is a non-continuous frequency range.

20. A communication device, comprising
a frequency range allocating device, comprising
a determination unit configured to determine available frequency ranges within a plurality of frequency ranges, wherein a frequency range is available if the frequency range is not being used by an incumbent communication service,
a combiner configured to combine the available frequency ranges to at least one combined logical frequency range, and
an allocator configured to allocate the at least one combined logical frequency range to only one communication device,
wherein the at least one combined logical frequency range is a non-continuous frequency range.

21. The communication device of claim 20, being a wireline communication device.

22. The communication device of claim 20, being a powerline communication device.

23. The communication device of claim 20, being a radio communication device.

24. The communication device of claim 23, being a mobile radio communication device.

25. The communication device of claim 23, being a satellite radio communication device.

26. The communication device of claim 23, being a mobile radio base station.

27. The communication device of claim 20, being a terminal communication device.

28. The communication device of claim 20, being a Consumer Premise Equipment device.

29. A frequency range allocating device, comprising:

a determination unit configured to determine available frequency ranges within a plurality of frequency ranges, wherein a frequency range is available if the frequency range is not being used by an incumbent communication service;

a combiner configured to combine the available frequency ranges to at least one combined logical frequency range;

an allocator configured to allocate the at least one combined logical frequency range to only one communication device, wherein the at least one combined logical frequency range is a non-continuous frequency range;

a controller configured to determine, after allocation of the at least one combined logical frequency range to the one communication device, determining, whether a first frequency range is used by a communication device of higher priority than the one communication device the frequency range has been allocated to; and configured to release the determined frequency range from the one communication device.

* * * * *